US008891540B2

(12) United States Patent
Krishna et al.

(10) Patent No.: US 8,891,540 B2
(45) Date of Patent: Nov. 18, 2014

(54) INLINE NETWORK ADDRESS TRANSLATION WITHIN A MOBILE GATEWAY ROUTER

(75) Inventors: Gopi Krishna, Tracy, CA (US); Apurva Mehta, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 246 days.

(21) Appl. No.: 13/471,252

(22) Filed: May 14, 2012

(65) Prior Publication Data
US 2013/0301522 A1 Nov. 14, 2013

(51) Int. Cl.
*H04L 12/28* (2006.01)
*H04J 3/24* (2006.01)

(52) U.S. Cl.
USPC ............................ 370/401; 370/393; 370/474

(58) Field of Classification Search
CPC ............ H04L 61/2503; H04L 61/2517; H04L 65/2546; H04L 65/61; H04L 65/255
USPC ................. 370/389–390, 392, 393, 401, 472, 370/474–476
See application file for complete search history.

(56) References Cited

U.S. PATENT DOCUMENTS

| | | | |
|---|---|---|---|
| 6,687,245 B2 | 2/2004 | Fangman et al. | |
| 6,985,479 B2 | 1/2006 | Leung et al. | |
| 7,184,437 B1 | 2/2007 | Cole et al. | |
| 7,206,312 B2 | 4/2007 | Kong | |
| 7,346,044 B1* | 3/2008 | Chou et al. | 370/352 |
| 7,369,563 B2 | 5/2008 | Choi et al. | |
| 7,403,976 B2 | 7/2008 | Brown | |
| 7,624,195 B1 | 11/2009 | Biswas et al. | |
| 7,653,745 B1 | 1/2010 | Biswas et al. | |
| 7,672,311 B2 | 3/2010 | Iwai et al. | |
| 7,782,878 B2 | 8/2010 | Talucci | |
| 8,135,013 B2 | 3/2012 | Hazard | |
| 8,144,709 B2 | 3/2012 | Hazard | |
| 8,363,647 B2 | 1/2013 | Fangman et al. | |
| 8,656,052 B2* | 2/2014 | Carothers | 709/245 |
| 2008/0044181 A1 | 2/2008 | Sindhu | |
| 2008/0107112 A1 | 5/2008 | Kuo et al. | |

(Continued)

FOREIGN PATENT DOCUMENTS

JP 4705656 B2 6/2011

OTHER PUBLICATIONS

"3GPP TS 36.300—Evolved Universal Terrestrial Radio Access (E-UTRA) and Evolved Universal Terrestrial Radio Access Network (E-UTRAN)," Release 10, 3rd Generation Partnership Project, Technical Specification Group Radio Access Network, Jun. 2010, 183 pp.

(Continued)

*Primary Examiner* — Redentor Pasia
(74) *Attorney, Agent, or Firm* — Shumaker & Sieffert, P.A.

(57) ABSTRACT

Techniques are described for performing inline NAT functions in a forwarding element of a mobile gateway router or other device in which subscriber sessions of a mobile access network are distributed across a plurality of session management cards. The session management cards pre-allocate a public network address and port range for subscribers at the time a network connection is established in response to connection request prior to receiving any data traffic associated with the subscriber. NAT profiles are programmed into hardware forwarding elements of the mobile gateway router for inline NAT when routing subscriber traffic for the mobile access network.

12 Claims, 6 Drawing Sheets

(56) References Cited

U.S. PATENT DOCUMENTS

| | | | |
|---|---|---|---|
| 2009/0109983 | A1 | 4/2009 | Dixon et al. |
| 2009/0129301 | A1* | 5/2009 | Belimpasakis ............... 370/310 |
| 2009/0268734 | A1 | 10/2009 | Wang et al. |
| 2011/0047256 | A1* | 2/2011 | Babu et al. ................... 709/223 |
| 2011/0196945 | A1* | 8/2011 | Alkhatib et al. ............. 709/220 |
| 2011/0249682 | A1 | 10/2011 | Kean et al. |
| 2012/0023257 | A1* | 1/2012 | Vos et al. ...................... 709/232 |
| 2013/0067110 | A1 | 3/2013 | Sarawat et al. |
| 2013/0103904 | A1 | 4/2013 | Pangborn et al. |
| 2013/0166763 | A1* | 6/2013 | Forsback ...................... 709/228 |

OTHER PUBLICATIONS

U.S. Appl. No. 12/905,771, entitled "Collectively Addressing Wireless Devices," filed Oct. 15, 2010.

U.S. Appl. No. 13/172,505, entitled "Variable-Based Forwarding Path Construction for Packet Processing Within a Network Device," filed Jun. 29, 2011.

U.S. Appl. No. 13/172,556, filed Jun. 29, 2011 entitled Mobile Gateway Having Decentralized Control Plane for Anchoring Subscriber Sessions.

U.S. Appl. No. 61/054,692, filed May 20, 2008 entitled Streamlined Packet Forwarding Using Dynamic Filters for Routing and Security in a Shared Forwarding Plane.

Donley et al. "Deterministic Address Mapping to Reduce Logging in Carrier Grade NATs draft-donley-behave-deterministic-cgn-00" Network Working Group, Internet-Draft, IETF Trust, Sep. 26, 2011, 10 pgs.

U.S. Appl. No. 13/350,545, filed Jan. 13, 2012 entitled Load Balancing Deterministic Network Address Translation Across Session Management Modules.

U.S. Appl. No. 13/326,903, filed Dec. 15, 2011 entitled Deterministic Network Address and Port Translation.

Response to European Office Action dated Nov. 25, 2013, from European Counterpart Application No. 12196823.4, filed Mar. 25, 2014, 14 pp.

* cited by examiner

INLINE NETWORK ADDRESS TRANSLATION WITHIN A MOBILE GATEWAY ROUTER

TECHNICAL FIELD

The invention relates to computer networks and, more particularly, to access networks for mobile wireless devices.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an enhancement of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network uses a variety of control protocols to authenticate users and establish logical connections, known as bearers, among the many service nodes on a path between a wireless device, attached to one of the radio access networks, and a packet data network (PDN). The service nodes then utilize the bearers, which employ data protocols, to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

To provide the packet-based data services, each mobile service provider network allocates network addresses to the wireless devices in accordance with a network address allocation protocol, such as a dynamic host configuration protocol (DHCP). For example, a DHCP server, Radius server or AAA server may dynamically assign a private address to a customer mobile device upon establishing a network connection for the subscriber equipment. These private network addresses are not routable outside the service provider network. Instead, a network address translation (NAT) device translates the private addresses currently used by each wireless device to public network addresses that are routable within a public network, such as the Internet. That is, upon receiving a first outbound packet for a subscriber communication session (flow), the NAT device selects a public network address and binds a private network address of the outbound packet to the public network address. Thereafter, the NAT device translates the private network address to the public network address for outbound packets and reverse translates inbound packets of the subscriber communication session in accordance with the binding. In many environments, the number of publicly available network address is significantly less than the number of private network addresses that must be supported. These environments utilize network address and port translation (NAPT) in which a private address and port are mapped to a specific combination of a public address and port. As such, different private network addresses for different mobile devices may use different port ranges within the same public network address.

SUMMARY

In general, techniques for network address translation (NAT) within a mobile access network are described. In one example, techniques are described for performing NAT inline within a forwarding plane of a mobile gateway router or other service node. In some examples, the techniques may be applied within a mobile gateway router in which subscriber sessions are distributed across a plurality of session management cards that provide control plane operations for thousands or millions of concurrent subscribers.

In one example embodiment, a mobile gateway router comprises a plurality of interfaces configured to send and receive network packets for wireless devices of subscribers of a mobile access network. A plurality of session management cards provide a distributed control plane to establish network connections for the wireless devices in accordance with private network addresses assigned to the wireless devices. A forwarding integrated circuit having a forwarding information base (FIB) routes the packets between the plurality of interfaces. The forwarding integrated circuit comprising an internal network address translation (NAT) element. Each of the session management cards is programmed to construct, for each subscriber, a NAT profile upon authenticating the subscriber and prior to receiving subscriber data traffic from the subscriber. The NAT profile specifies a pre-allocated public network address and port range. The session management cards are programmed to install the NAT profiles within the forwarding integrated circuit of the mobile gateway router for inline NAT within the forwarding integrated circuit when routing packets for the subscribers.

In another example embodiment, a method comprises receiving, with a mobile gateway router, a request to attach a wireless device of a subscriber to a mobile wireless network. The method further comprises establishing, with a control plane of the mobile gateway router, a packet-based network connection for the wireless device to communicate using the mobile wireless network, including assigning a private network address to the wireless device. Upon establishing the network connection and prior to receiving subscriber data traffic from the wireless device, the control plane of the mobile gateway router pre-allocates with a public network address and a port range for the wireless device, constructs a network address translation (NAT) profile specifying the public network address and the port range, installs the NAT profile within a hardware forwarding element of the mobile gateway router. The method further comprises, upon receiving a packet of a new packet flow of the subscriber data traffic, dynamically selecting a port within the port range of the NAT profile for the subscriber, creating a NAT binding within the hardware forwarding element that maps the private network address for the wireless device to the public network address and the selected port, and performing network address translation on packets for the packet flow within the hardware forwarding element based on the NAT binding.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
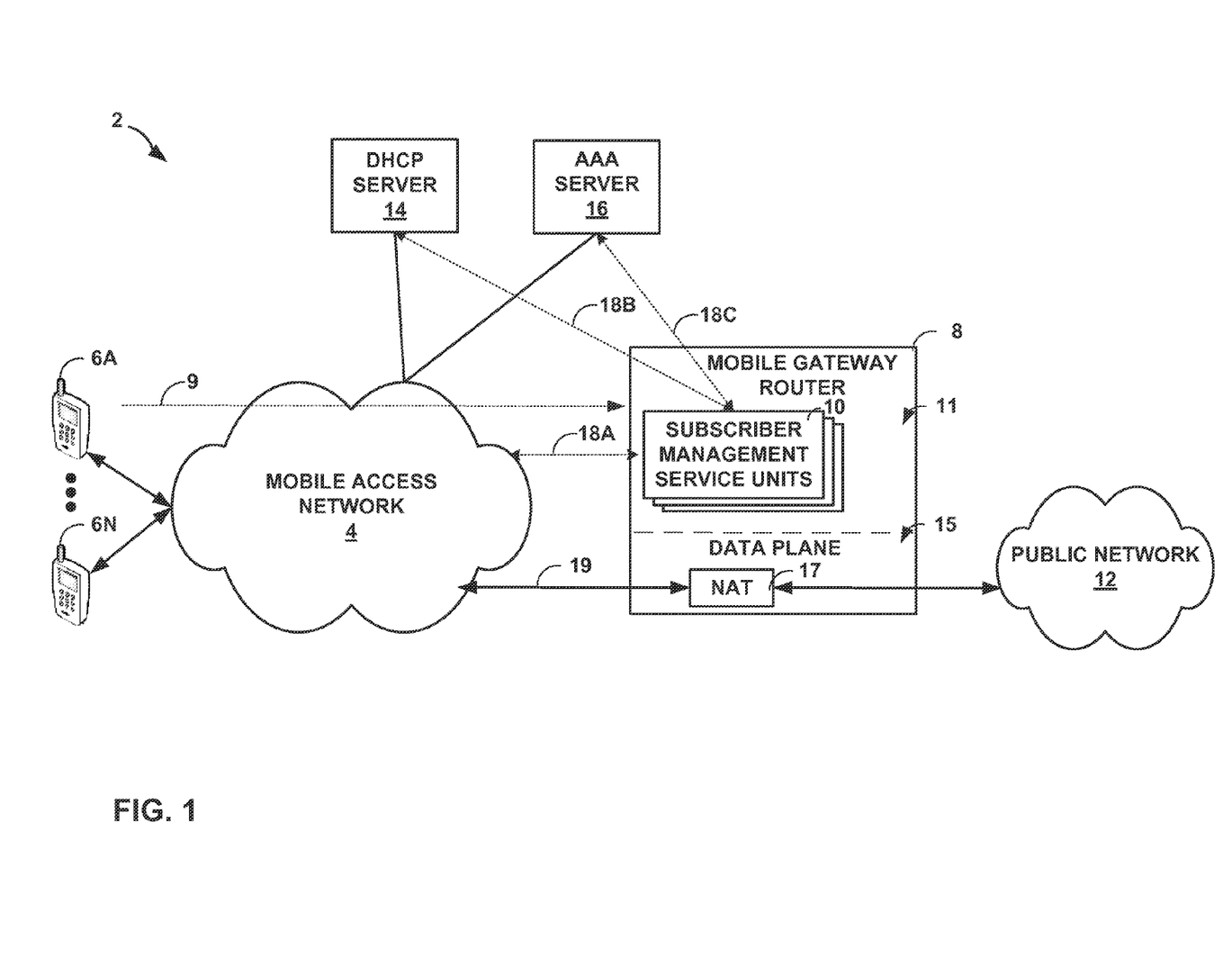
FIG. 1 is a block diagram illustrating an exemplary network system that implements the network address translation techniques described in this disclosure.

FIG. 1 is a block diagram illustrating an exemplary network system 2 that implements the network address translation techniques described in this disclosure. As shown in the example of FIG. 1, network system 2 includes mobile access network 4 coupled to public network 12 via mobile gateway router 8 of mobile access network 4. Mobile access network 4 operates as a private network, e.g., a service provider network, that provides packet-based data services to mobile devices 6A-6N ("mobile devices 6"). As examples, the packet-based data services may include provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise any computer network requiring routable network addresses, for instance, the Internet, a wide area network (WAN), a virtual LAN (VLAN), an enterprise IP network, a layer three (L3) virtual private network (VPN), or the like. Public network 12 executes one or more packet data protocols (PDPs), such as IP (IPv4 and/or IPv6), X.25 or Point-to-Point Protocol (PPP), to enable packet-based transport of public network 12 services.

Each of mobile devices 6 is a wireless communication device for a subscriber (alternatively, a "subscriber device") that may comprise, for example, a mobile telephone, a laptop or desktop computer having, e.g., a 3G/4G wireless card, a wireless-capable netbook, a video game device, a pager, a smart phone, or a personal data assistant (PDA). Each of mobile devices 6 may run one or more applications, such as VoIP clients, video games, videoconferencing, E-mail, and Internet browsers, among others. Certain applications running on mobile device 6 may require access to services offered by public network 12. Mobile devices 6 may also be referred to, in various architectural embodiments, as User Equipment (UE) or Mobile Stations (MS), and may alternatively be referred to herein as mobile devices.

Typically, a service provider operates mobile access network 4 to provide network access, data transport and other services to mobile devices 6 attached to mobile access network 4. In general, mobile access network 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GPP/2), an Internet Engineering Task Force (IETF) and a Worldwide Interoperability for Microwave Access (WiMAX) forum. For example, mobile access network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Mobile access network 4 may, alternatively or in conjunction with one of the above, implement a Code Division Multiple Access-2000 ("CDMA2000") or Enhanced Data Rates for GSM Evolution (EDGE) architecture. Mobile access network 4 may, again as an alternative or in conjunction with one or more of the above, implement a WiMAX architecture defined by the WiMAX forum.

In some examples, mobile access network 4 may comprise a core packet-switched network and one or more radio access networks. A core packet-switched network of mobile access network 4 may comprise, for example, a general packet radio service (GPRS) core packed-switched network, an IP-based mobile multimedia core network, or an Evolved Packet Core (EPC) or Evolved Packet System (EPS). The core packet-switched network of mobile access network 4 comprises intermediate devices required to implement the control and data protocols of the particular architectural embodiment of mobile access network 4, such as Serving GPRS Serving Nodes (SGSNs), Serving Gateways (S-GWs) and Mobility Management Entities (MMEs). Mobile devices 6 communicate with mobile access network 4 using a wireless communication link to one of the radio access networks of the content access network. Radio access networks of mobile access network 4 may include, for example, for example, a GSM Radio Access Network (GRAN), a WiMAX radio access network, a UMTS Radio Access Network (UTRAN), and/or an evolution of a UTRAN known as an E-UTRAN. Mobile access network 4 may further include a backhaul or transport network (not shown) that includes land-based transmission lines, frequently leased by a service provider for the content access network, to transport user and control traffic between mobile devices 6 and mobile gateway router 8. The backhaul network also includes network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the example of FIG. 1, mobile gateway router 8 is a network device that operates as a gateway to public network 12 and may comprise, for example, a Gateway GPRS Serving Node (GGSN), an Access Gateway (aGW), or a Packet Gateway (P-GW). Mobile gateway router 8 may present a uniform interface to downstream nodes, such as SGSNs, S-GWs, and MMEs, to allow the downstream nodes to address service and/or signaling traffic to the uniform interface rather than separately directing such traffic among multiple devices or multiple control plane entities (e.g., service cards) within a single device. In addition, mobile gateway router 8 may present a uniform interface to control plane servers, illustrated in FIG. 1 as Dynamic Host Configuration Protocol (DHCP) server 14 and authentication, authorization, and accounting (AAA) server 16, to allow the control plane servers to address control plane protocol traffic for the various control protocols to the uniform interface rather than separately directing such traffic among multiple devices or multiple control plane entities within mobile gateway router 8. In some instances, the uniform interface is an IP address or other network layer address of mobile gateway router 8 that is shared among all control plane entities, including subscriber management service units 10. In addition, any one of subscriber management service units 10 may anchor a session for any service (identified, for instance, by an Access Point Name (APN)) for which mobile gateway router 8 operates as a gateway.

In some implementations, mobile gateway router 8 is a router that executes routing protocols to identify routes through mobile access network 4 or public network 12 to various destinations. While described herein with respect to one or more particular architectures for ease of illustration purposes, mobile access network 4 may implement any architecture including those set forth by any standards body and those proprietarily owned. Moreover, the techniques may apply to any mobile data protocol supported by these architectures and to any device that implements or otherwise uses such mobile data protocols. For example, the techniques described with respect to mobile gateway router 8 may be performed by downstream nodes, such as SGSNs, S-GWs, and MMEs. The techniques therefore should not be limited to cellular architectures referenced to herein and the mobile data protocols supported by these architectures. Mobile gateway router 8 and other elements of mobile access network 4 may, therefore, each represent an abstraction of devices found within any type of mobile network architectures.

Mobile access network 4 establishes and operates bearers to transport user traffic, in the form of PDP packet data units (PDUs), referred to hereinafter as "packets." In general, a bearer is a set of network resources and data transport functions in mobile access network 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Any of mobile devices 6 may initiate a connection request 9 to attach to mobile access network 4 to enable service traffic exchange with public network 12. Connection request 9 typically includes a mobile device identifier that uniquely identifies mobile device 6 to mobile gateway router 8. The wireless device identity may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber user-name, an MSISDN number (e.g., a "Mobile Subscriber Integrated Services Digital Network Number") or other data identifying mobile device 6. In this way, mobile gateway router 8 may receive a wireless device identity for mobile device 6 in connection request 9.

While illustrated as a single message from a mobile device 6 to mobile gateway router 8, connection request 9 may represent a plurality of messages that traverse intermediate network devices of mobile access network 4 to identify mobile device 6 to mobile gateway router 8. For example, in an LTE architecture, connection request 9 may represent an initial Attach Request message issued by mobile device 6 to an eNode B, which forwards the request to an MME. The MME may incorporate information received in the Attach Request message, including the wireless device identity, into a first Create Session Request message that the MME then sends to an SGSN and that is also represented by connection request 9. The SGSN generates a second Create Session Request message that incorporates information received by the SGSN in the first Create Session Request, such as the wireless device identity. The second Create Session Request message, which is sent by the SGSN to a GGSN represented by mobile gateway router 8, is also represented by connection request 9. As another example, connection request 9 may represent an Activate PDP Context Request message from mobile device 6 to an SGSN and a Create PDP Context Request message from the SGSN to mobile gateway router 8. Other mobile network architectures may have similar messaging schemes to identify mobile device 6 to mobile gateway router 8 as part of an attach procedure or other procedure to establish a requested session. In addition, the initial Attach Request or Active PDP Context Request message may be responsive to a request by mobile gateway router 8 to mobile device 6 to initiate a session with mobile gateway router 8.

Mobile access network 4 notifies mobile gateway router 8 of the attach request. In the example of FIG. 1, mobile gateway router 8 includes a plurality of subscriber management service units 10, any one of which may establish a subscriber connection for the requesting mobile device 6 by executing control protocols 18A-18C to (1) identify and authenticate the wireless device with AAA server 16, (2) receive PDP address configuration information from DHCP server 14, and (3) communicate with mobile access network 4 to establish a default bearer to carry user traffic for the requesting mobile device 6 through the mobile access network.

As described in further detail below, mobile gateway router 8 receives connection request 9 and distributes the connection request to one of the plurality of subscriber management service units 10 based on the wireless device identity carried by the session request. That is, mobile gateway router 8 selects an associated one of subscriber management service units 10 for connection request 9 and sends the connection request to the selected subscriber management service unit for handling. The selected one of subscriber management service units 10 receives connection request 9 and establishes a subscriber connection for the mobile device 6 to communicate with public network 12. Thereafter, the subscriber management selected service unit 10 anchors the newly established connection by handling all control traffic for the connection and maintaining data for the connection, such as accounting, billing, policy allocation and other control plane functions. Performing decentralized session request handling in this manner may enable mobile gateway router 8 to scale a number of subscriber connections by adding additional subscriber management service units 10.

In general, a subscriber connection is an association between mobile access network 4 and any of mobile devices 6 that is identifiable by a combination of a mobile device 6 PDP address and an Access Point Name (APN) for a service provided by public network 12. For example, the subscriber connection may be a service-specific (as specified by the APN) session for a service provided to the associated one of mobile devices 6. Besides establishing a default bearer, the attach procedure may trigger establishment, by mobile access network 4, of one or more dedicated bearers between mobile gateway router 8 and the requesting mobile device 6 to carry user traffic. Because any of subscriber management service units 10 may establish and operate requested subscriber connections for any of mobile devices 6, each of subscriber management service units 10 may execute all of the control protocols required to establish a subscriber connection in response to a subscriber request to create or modify the subscriber connection.

Upon authenticating a network access request, each mobile device 6 is assigned a private layer three (L3) network address (e.g., an IPv4 network address) for receiving data services within mobile access network 4. This may be accomplished in a variety of ways. For example, the private network address may be statically configured on the mobile devices 6 or may be dynamically or statically assigned by DHCP server 14 or AAA server 16 (or gateway 8). As one example, DHCP server 14 may exchange, in protocol sessions 18B, address allocation protocol messages with any of subscriber management service units 10 to allocate PDP addresses to wireless devices that attach to mobile access network 4 to enable mobile devices 6 to communicate with public network 12. DHCP server 14 may execute DHCP or another address allocation protocol with which to allocate PDP addresses from a pool of private network addresses. As another example, AAA server 16 may execute a AAA protocol (e.g., Remote Dial-In User Authentication Service (RADIUS) or Diameter) and exchanges, in protocol sessions 18C, AAA protocol messages with any of subscriber management service units 10 to identify and authenticate mobile devices 6 seeking to attach to mobile access network 4. As a still further example, elements of mobile access network 4 execute a bearer setup protocol such as GPRS tunneling protocol (control) (GTP-C) and exchange, in protocol sessions 18A, GTP-C messages with any of subscriber management service units 10 to establish and modify bearers for mobile devices 6. Each of protocol sessions 18A, 18B, and 18C (collectively referred to hereinafter as "protocol sessions 18") may represent one or more control-plane protocol sessions for establishing and maintaining subscriber connections.

Any one of subscriber management service units 10 may execute all of the control protocols required to establish/maintain a subscriber connection. In this way, mobile gateway router 8 is divided into two logical or physical "planes" to include a control plane 11 and a "data" or "forwarding" plane 15. That is, mobile gateway router 8 implements two separate functionalities, e.g., the routing/control provided by subscriber management service units 10 and forwarding/data functionalities provided by data plane 15. Data plane 15, also referred to as a forwarding plane, processes and forwards data packets 19 between mobile access network 4 and public network 12. For example, forwarding unit 11 may comprise a plurality of forwarding units coupled by a high-speed switch fabric to handle data packets 19 for thousands or millions of concurrent subscriber sessions for mobile devices 6. In some embodiments, subscriber management service units 10 may also be viewed as service cards that operate in a "service plane" to provide control plane functions.

In accordance with techniques described herein, mobile gateway router 8 includes a network address translation (NAT) element 17 that provides network address translation for private network addresses routable within service provider network to public network addresses routable within public network 12. As described herein, mobile gateway router 8 applies a source network address and port translation (NAPT) mechanism inline within data plane 15. That is, NAT element 17 applies NAT to subscriber traffic for thousands or millions of subscriber sessions without necessarily having to forward the traffic to subscriber management service units 10 of control plane 11 or an external NAT device.

For example, when routing outbound packets of subscriber data traffic 19, from mobile access network 4 destined for a destination address within public network 12, NAT element 17 of data plane 15 (e.g., a specialized forwarding ASIC) applies a binding that maps private source addresses of the outbound packets identifies to public addresses and ports. NAT element 17 performs network address translation to translate the private source network address within the packet to the public network address and port number bound to the particular subscriber communication session. During this process NAT element 17 may replace all or a portion of a header (e.g., IP or UDP header) of the packet prior to forwarding the packet to public network 12. Upon receiving an inbound packet from public network 12, NAT element 17 identifies a current NAT entry for the communication session and maps the public destination network address and the destination port to the corresponding private network address and port. NAT element 17 may then replace all or a portion of a header (e.g., IP or UDP header) within the packet prior to forwarding the packet to mobile access network 4.

In one example, a public network address and port range for a subscriber is pre-allocated at the time a network connection is established in response to connection request 9 prior to receiving any data traffic 19 associated with the subscriber. For example, during login and authentication, DHCP server 14 or an anchoring one of subscriber management units may allocate a private network address to mobile device 6 from a pool of private addresses. At this time, a public network address and port range is pre-allocated for NAT bindings for subsequent communication sessions (packet flows) for the network connection. For example, DHCP server 14 may pre-allocate the public network address and port range when allocating the private network address for an authenticated mobile device 6 requesting a new subscriber session. Alternatively, the anchoring subscriber management service units 10 for the subscriber session may pre-allocate the public network address and port range from a database or pool of public addresses.

In either case, the anchoring subscriber management service unit 10 responsible for managing a network connection may program NAT element 17 of data plane 15 with a NAT profile upon attaching a mobile device 6 to the mobile access network 4. Data plane 15 uses the NAT profile to dynamically provide inline NAT for any subscriber communication sessions (packet flows) subsequently originating from the mobile device 6 without requiring additional programming or configuration from control plane 11.

The techniques allow NAT address port allocation and translation to be established and applied inline within data plane 15. Moreover, the techniques allow inline NAT to be dynamically established within data plane 15 for any flow originating from a given subscriber without necessarily requiring interaction with control plane 11 of mobile gateway router 8. In this way, NAT functionality within mobile access network 4 may scale to thousands or even millions of concurrent mobile devices 6 and provide significant improvement in throughput.

The techniques may allow NAT to be performed in a wireless gateway device, e.g., a mobile switching router, yet still achieve high data rates that meet or exceed terabyte line rates for subscriber traffic 19 for millions of subscriber flows. These rates may have been previously unattainable in environments where the subscriber traffic was required to flow through a services plane or control plane for NAT processing or through an external NAT device.

Further, the techniques described here may reduce or eliminate dependency on external NAT devices that may otherwise be positioned at the border of mobile access network 4 and public network 12. Moreover, address affinity may be maintained. That is, since NAT bindings are pre-allocated, a public address is always bound to the same source (private) address irrespective of the public destination address, hence achieving endpoint independent mapping (EIM). Further, any public address can be used for any subscriber, i.e., for any mobile device 6. The techniques allow a public network address can be randomly selected from the pool and the port block may similarly be randomly selected. Further, NAT element 17 of data plane 15 may randomly select a port from the allocated port range.

Figure 2:
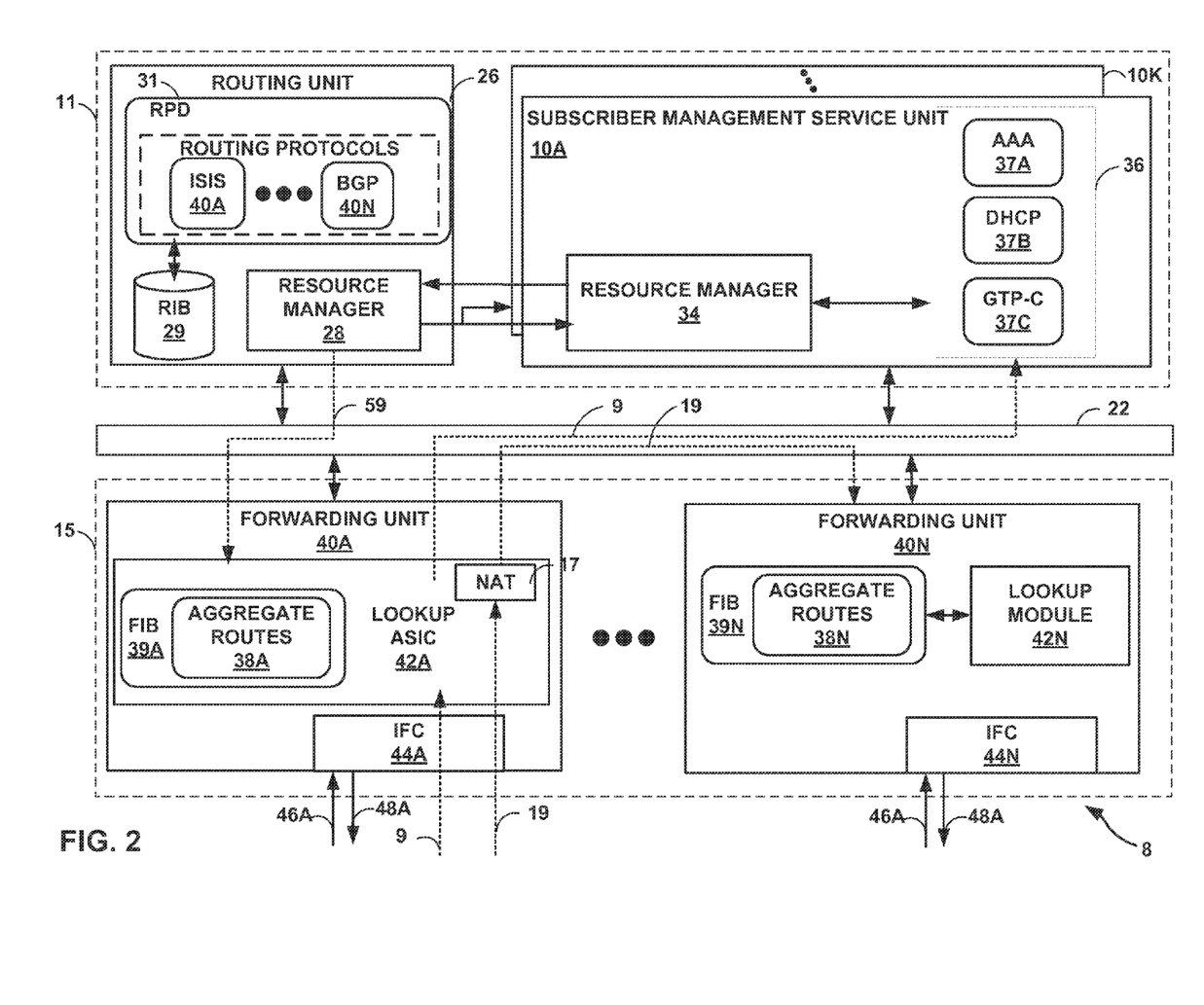
FIG. 2 illustrates an example mobile gateway router that incorporates the NAT functions described herein.

FIG. 2 is a block diagram illustrating, in further detail, an example embodiment of mobile gateway router 8 of FIG. 1 that incorporates the NAT functions described herein. In this example, mobile gateway router 8 is divided into two logical or physical "planes" to include a first control plane 11 and a second "data" or "forwarding" plane 15. That is, mobile gateway router 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 11 is a decentralized control plane in that control plane functionality is distributed among routing unit 26 and a plurality of subscriber management service units 10A-10K ("subscriber management service units 10"). Similarly, data plane 15 in this example is a decentralized data plane in that data plane functionality and packet forwarding functionality is distributed among a plurality of forwarding units 40A-40N ("forwarding units 40"). In the example of mobile gateway router 8 of FIG. 2, data plane 15 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a mobile gateway router 8 chassis or combination of chassis.

Switch 22 couples routing unit 26, subscriber management service units 10, and forwarding units 40 to deliver data units and control messages among the units. Switch 22 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 26 executes the routing functionality of mobile gateway router 8. In this respect, routing unit 26 represents hardware or a combination of hardware and software of control that implements routing plane routing protocols 40A-40N ("routing protocols 40") by which routing information stored in a routing information base 29 ("RIB 29") may be determined. RIB 29 may include information defining a topology of a network, such as mobile access network 4 of FIG. 1. Routing protocols 40 interact with a kernel (e.g., by way of API calls) executing on routing engine 26 to update routing information base (RIB) 44 based on routing protocol messages received by mobile gateway router 8. Routing unit 26 may resolve the topology defined by routing information in RIB 29 to select or determine one or more routes through the network. For example, the kernel may generate forwarding information in the form forwarding information bases 39A-39N ("FIBs 39") based on the network topology represented in RIB 29, i.e., performs route resolution. For example, the kernel may determine the physical interface port to be used for the forwarding next hops. Routing unit 20 may then program forwarding units 40 of data plane 15 with FIBs 39, which installs the FIBs within lookup ASICs 42.

As shown in the example of FIG. 2, each of forwarding units 40A-40N includes a respective lookup ASIC 42A-42N that receives control and data session traffic via IFC cards 44 and internally forwards the traffic to the anchoring one of subscriber management service units 10 (control traffic) or to the anchoring one of forwarding units 40 (data traffic) according to internal routes installed to FIBs 39, including aggregate routes 38. In one example, lookup ASICs 42 are microcode-controlled chipsets programmably configured by a slave microprocessor executing on each of forwarding units 40. Specifically, one or more of lookup ASICs 42 is controllable by internal microcode programmed by the slave microprocessor. The slave microprocessor programs a corresponding FIB 39 into internal memory of each lookup ASICs 42 within the data plane 15.

IFC cards 44 receives subscriber data packets 19 on inbound interface 446 and direct the data packets to lookup ASICs 42. Forwarding units 40 may receive subscriber traffic on an SGi/Gi or SGn/Gn interface, for example. Lookup ASICs 42, in turn, determines a matching one of aggregate routes 38 and forwards, via switch 22, subscriber data packets 19 to the forwarding unit specified by the aggregate route. That is, lookup ASICs 42 receives subscriber data packets 19 and may internally route the data packets according to aggregate routes 38 to forwarding units 40 that anchor the respective subscriber network connection associated with the traffic.

When forwarding packets, control logic within each lookup ASICs 42 traverses FIB 39 and, upon reaching a FIB entry for the packet (e.g., a leaf node), the microcode-implemented control logic automatically selects one or more forwarding next hops (FNHs) for forwarding the packet. Lookup ASIC 42A may be implemented using a forwarding application specific integrated circuits (ASICs), field programmable gate arrays (FPGAs), or any other equivalent integrated or discrete logic circuitry, as well as any combinations of such components. Each of forwarding units 40 may include substantially similar components to perform substantially similar functionality, said components and functionality being described hereinafter with respect to forwarding unit 40A.

Resource manager 28 of routing unit 26 operates as a process or "daemon" to receive static or dynamic resource-related information for mobile gateway router 8 and publish the information to subscriber management service units 10 and forwarding units 40. For example, resource manager 28 may be statically configured, by an administrator or other entity using a management interface, with information describing subscriber management service units 10 such as the number of service units as well as respective capacities of the individual service units (e.g., the number of sessions that the service unit is able to anchor). Resource manager 28 may download statically or dynamically updated resource-related information for subscriber management service units 10 to forwarding units 40.

Subscriber management service units 10 provides control plane functionality for establishing and managing the various network connections requested mobile devices 6, including authentication, accounting and control plane communication with downstream gateway devices or other bearers. As shown, each subscriber management unit 10 provides a computing environment for executing various control protocols 37A-37C, such as AAA service 37A, DHCP service 37B and GTP-C service 37C. Connection control module 36 stores subscriber data, received in control plane protocol messages received by connection control module 36 or allocated by connection control module 36, for one or more network connections anchored by service unit 10A. Service unit 10A may be referred to as the anchoring service unit for connections in that service unit 10A stores control and forwarding information needed to manage the network connections. Each of subscriber management service units 10 includes an instance of connection control module 36 and may therefore independently execute control plane protocols required to establish a session for a subscriber.

IFC card 44A receives network attachment requests 9 and other control messages on inbound interface 46A and forwards the network attachment requests to lookup ASIC 42A. Lookup ASIC 42A, in turn, determines a matching one of aggregate routes 38A and forwards, via switch 22, the control message to the subscriber management service unit specified by the aggregate route, which in this example is subscriber management service unit 10A. For example, lookup ASIC 42A may delegate the requests to a selected one of subscriber management service units 10 according to an association between the respective wireless identifiers or another property of the requests and the selected service unit 10 for the network attachment request. The association may be a result of a hash or other function performed on request field values. In the illustrated example, upon receiving a network connection request 9, lookup ASIC 42A selects associated service unit 10A to handle the network connection request and forwards the network connection request to service unit 10A. Lookup ASIC 42A may process the network connection request to remove GTP and other headers. The network connection request may represent an example of connection request 9 of FIG. 1 and may include, for instance, a Create Session Request message transmitted by a Serving Gateway (S-GW) to mobile gateway router 8 operating as a PGW of an EPC of an LTE network or a Create PDP Context Request transmitted by an SGSN to mobile gateway router 8 operating as a GGSN of a GPRS packet-switched network. The network connection request may include a wireless device identifier (e.g., an IMSI) and may further include an Access Point Name that identifies a packet data network and may in some instances further identify a requested service (e.g., Internet, WAP, or multimedia messaging service (MMS)) provided by the packet data network. In other words, the APN is a logical name that determines the appropriate gateway (e.g., GGSN) for the wireless device and by a gateway to determine the services requested by the user or the address of an access point in an external packet network to which user packets from the wireless device should be forwarded.

Upon receiving network connection request 9, connection control module 36 subscriber management service unit 10A process the request with processes control protocols 37A-37C to attach the requesting mobile device 6 to mobile access network 4. For example, subscriber management service unit 10A may execute AAA service 37A to identify and authenticate the wireless device with AAA server 16. Upon successfully authenticating the subscriber, subscriber management service unit 10A may execute DHCP service 37B to receive address configuration information from DHCP server 14, and may execute GTP-C service 37C to communicate with mobile access network 4 to establish a default bearer to carry user traffic for the requesting mobile device 6 through the mobile access network. At this time, DHCP server 14 (or locally via DHCP service 37B) may allocate a private network address to the wireless device from a pool of private addresses. In addition, DHCP server 14 (or locally via DHCP service 37B) may pre-allocate a public network address and port range for NAT bindings for communication sessions (packet flows) originating from or destined for the network connection being attached to mobile access network 4. For example, DHCP server 14 or DHCP service 37B may pre-allocate the public network address and port range when allocating the private network address for an authenticated mobile device 6 requesting a new subscriber session.

When attaching the mobile device 6 to the mobile access network 4, resource manager 34 of anchoring subscriber management service unit 10A responsible for managing the new network connection communicates with the slave processor of forwarding unit 40A, either directly or via resource manager 28 of routing unite 31, to construct a subscriber-specific forwarding path within lookup ASIC 42A for processing and forwarding data traffic 19 from the newly attached mobile device. In addition, resource manager 34 directs forwarding unit 40A to program lookup ASIC 42A with a NAT profile for inline NAT for the specific subscriber. Lookup ASIC 42A stores the NAT profile within an internal high-speed memory storing NAT profiles for the subscribers anchored to forwarding unite 40A. Internal logic (NAT element 17) within the internal forward path of lookup ASIC applies the NAT profile to dynamically provide inline NAT for subscribe data traffic 19 for any subscriber communication sessions (packet flows) originating from or destined for the mobile device 6 associated with the attached network connection. In this manner, lookup ASIC 42A may provide inline NAT for subscribers without necessarily requiring additional programming or configuration from control plane 11 for each new communication session for the subscriber. Example details on subscriber management units 60 constructing subscriber-specific forwarding paths within forwarding units 68 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Upon processing an initial packet for a new communication session (packet flow), NAT element 17 dynamically creates a NAT binding for the new communication session in accordance with the NAT profile received from the anchoring subscriber management unit 10A. That is, NAT element 17 maintains an internal cache of NAT bindings for subscriber communication session, where each communication can be uniquely identified, such as by a five tuple comprising a source network address and port, destination network address and port, and protocol. When processing an outbound packet having a destination address within public network 12, NAT element 17 accesses the NAT bindings to determine whether a NAT binding exists for the particular packet flow. Upon detecting an outbound packet from mobile access network 4 for a new packet flow, NAT element 17 applies the NAT profile to determine the pre-allocated public network address and then dynamically selects a port within the pre-allocated port range for use with this particular communication session for the subscriber. In this way, in this example, the actual port allocation is performed at the time a new communication session (packet flow) is seen from the subscriber in accordance with the subscriber profile received from the anchoring subscriber management unit 10.

Upon assigning the public address and specific port, NAT element 17 updates its internal cache to record the NAT binding between the public address/port and the subscriber's private address/port for the packet flow. NAT element 17 similarly creates additional NAT bindings when processing initial packets for additional packet flows originating from or destined for the subscriber.

Upon determining the pre-allocated public address and dynamically selecting the port, NAT element 17 of lookup ASIC 42A performs network address translation to translate the private source network address and source port within the outbound packet to the computed public network address and the assign port number. Similarly, when processing outbound packets of subscriber data traffic 19 for an existing packet flow, NAT element 17 applies the corresponding NAT binding from its internal cache to map private source addresses of the outbound packets to public addresses and ports according to the binding. NAT element 17 performs network address translation to translate the private source network address within the packet to the public network address and port number bound to the particular subscriber communication session. During this process NAT element 17 may replace all or a portion of a header (e.g., IP or UDP header) of the packet prior to forwarding the packet to public network 12. When lookup ASIC 17 performs routing operations on an inbound packet from public network 12, NAT element 17 identifies a current NAT entry for the communication session and maps the public destination network address and the destination port to the corresponding private network address and port specified by the NAT binding. NAT element 17 may then replace all or a portion of a header (e.g., IP or UDP header) within the packet prior to forwarding the packet to mobile access network 4. Once NAT element 17 processes the first packet in a communication flow, NAT bindings for forward and reverse traffic are setup properly within its internal memory, and hence flow lookups for packets in that session will succeed. If the flow lookup succeeds, NAT or de-NAT action is performed using the existing NAT bindings within lookup ASIC 42A and packet is forwarded.

Functionality of subscriber management units 10 and routing unit 26 may be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

FIGS. 3-6 illustrate examples of a plurality of different types of NAT profiles that may be constructed by an anchoring subscriber management unit 10 and programmed into an anchoring forwarding unit 40 upon authenticating a subscriber and creating a network connection. Moreover, subscriber management units 10 may select an appropriate NAT profile based on configured or learned characteristics of a given subscriber, e.g., historical data received from forwarding plane 11. For example, as explained in further detail below, NAT profiles 80, 90, 100 and 130 of FIGS. 3-6 may be useful in different situations, such as whether port translation is required for the subscriber and the number of concurrent flows for which inline NAT should be supported for the subscriber.

Figure 3:
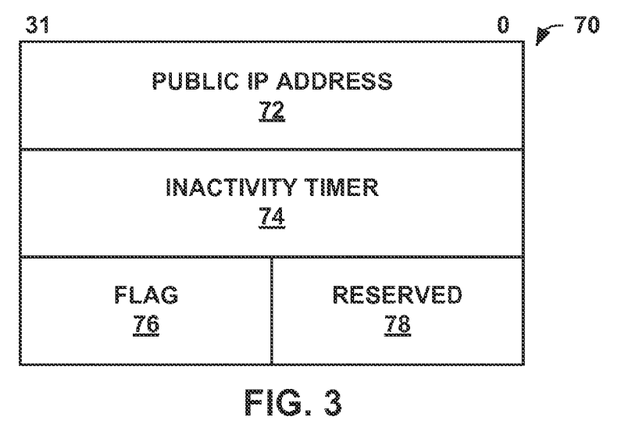
FIGS. 3-6 illustrate examples of a plurality of different types of NAT profiles that may be constructed by an anchoring subscriber management unit and programmed into an anchoring forwarding unit upon authenticating a subscriber and creating a network connection.

FIG. 3 illustrates an example NAT profile 70 is an example profile that may be constructed by an anchoring subscriber management unit 10 and programmed into an anchoring forwarding unit 40 when static NAT is to be used for the subscriber, i.e., where only the address is translated without requiring port translation. In the example of FIG. 3, NAT profile 70 includes an address field 72 that specifies the pre-allocated 32-bit public address for the subscriber. In addition, a second 32-bit word is used as an inactivity timer 74. The final 32-bit provides a set of flag bits 76 and a reserved region 78. Example uses of flag bits 76 may be: specifying static NAT versus NAPT, specifying whether ports are to be selected sequentially or randomly, specifying the level of bit mask used (e.g., whether a one level or two-level bit mask is used, and specifying whether endpoint independent or endpoint dependent mapping is to be used. Although described by way of example with respect to 32-bit words, the NAT profiles described herein may take other forms, such as 64-bit or 128-bit, which may be useful for IPv6.

Inactivity timer 74 may be used to specify an amount of time until NAT element 17 wait before should clear the NAT profile from the internal memory of lookup ASIC 42. Lookup ASIC 42 typically maintains internal timing structures that are updated upon receiving packet flows, and may configure the internal timing structures to add a corresponding timer upon being programmed with a NAT profile. Lookup ASIC 42 may reset the timer upon receiving a packet from the subscriber.

Figure 4:
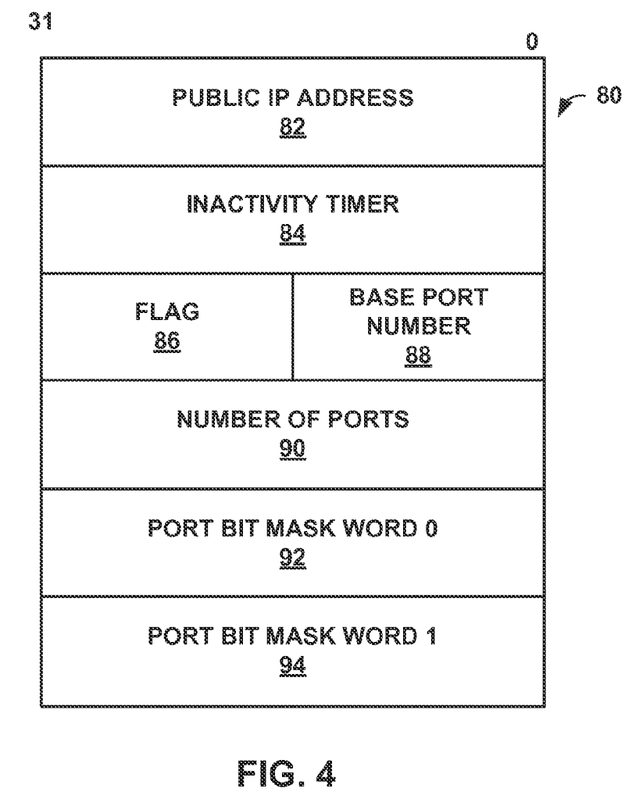

FIG. 4 illustrates another example NAT profile 80 that may be constructed by an anchoring subscriber management unit 10 and programmed into an anchoring forwarding unit 40 for subscribers that are configured for both network address and port translation (NAPT). In the example of FIG. 4, NAT profile 80 includes a 32-bit address field 82 that specifies the pre-allocated public address for the subscriber and a second 32-bit word is used as an inactivity timer 84. In addition, NAT profile 80 provides a set of flag bits 86, a base port number 88, a number of ports 90 and 64 bits of a port bit mask 92, 94.

Number of ports 88 specifies a maximum number of concurrent flows for the subscriber for which NAT bindings can be maintained. Thus, base port number 88 and number of ports 90 collectively specify the port range from which ports are dynamically selected and mapped to new packet flows for the subscriber. In this example, port bit mask 92, 94 provide a flat 64-bit wide bit mask for supporting up to 64 ports. Each time lookup ASIC 42 detects a new packet flow, NAT element 17 selects a free bit from the bit mask and adds its offset to base port number 88 to dynamically compute the port to use within the NAT binding. In the event the bit mask is full, i.e., all the ports within the port range are currently in use, NAT element 17 provides an error condition and lookup ASIC 42 configures FIB 39 such that the packet flow is forwarded to the anchoring subscriber management service unit 10 for applying NAT within control plane 11.

In the case of FIG. 4, inactivity timer 74 may be used to specify an amount of time until NAT element 17 should wait before clearing a NAT binding from the internal memory of lookup ASIC 42. NAT element creates a new timer within the internal timing structures of lookup ASIC 42 for each subscriber flow. Lookup ASIC 42 may reset a given timer upon receiving a packet for the corresponding packet flow of the subscriber. Upon expiration of a timer, NAT element 17 flushes the corresponding NAT binding from its internal cache and clear the corresponding bit within the bit map provided by port bit mask 92, 94.

Figure 5:
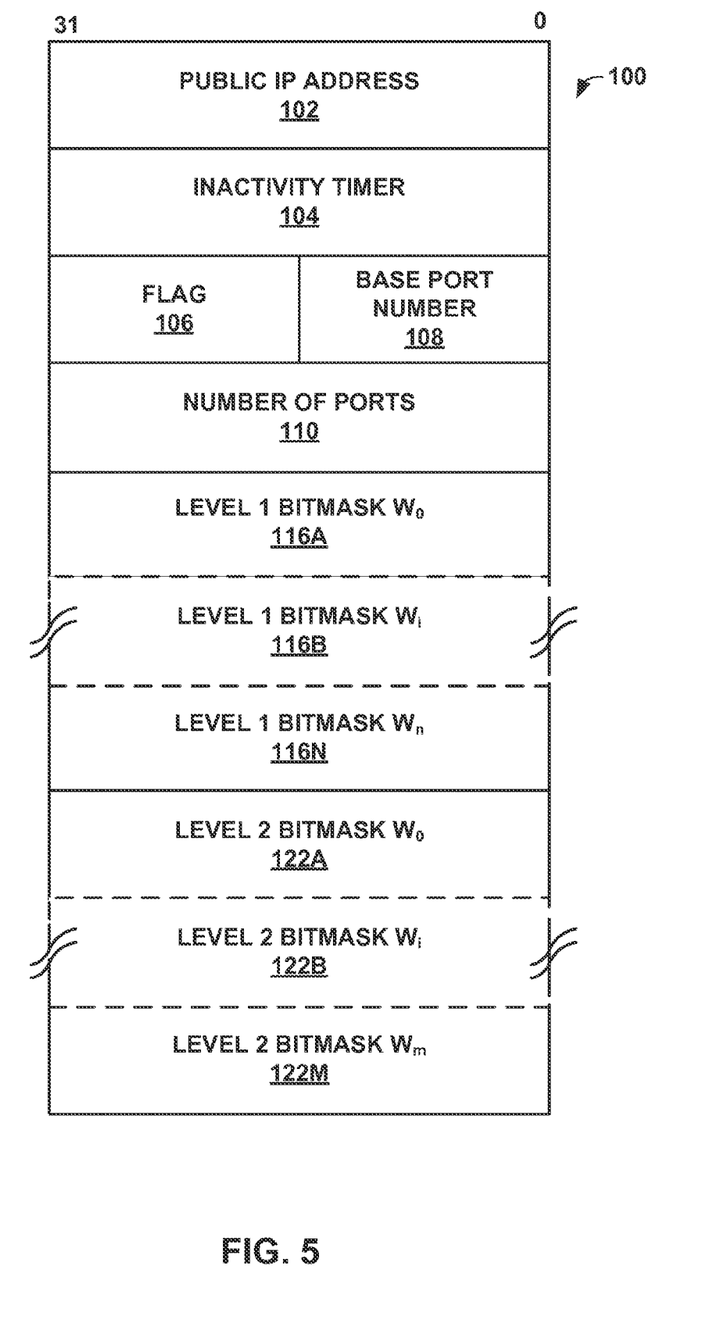

FIG. 5 illustrates another example NAT profile 100 that may be constructed by an anchoring subscriber management unit 10 and programmed into an anchoring forwarding unit 40 for a subscriber for which inline NAT is to be provided for more than 64 packet flows. NAT profile 100 is similar to NAT profile 80 in that NAT profile 100 includes a 32-bit address field 102 specifying a pre-allocated network address, an inactivity timer 104 for flushing NAT bindings for individual flows, a set of flag bits 106, and a base port number 108 and a number of ports 110 that defines a port range for the subscriber. However, in the example of FIG. 5, NAT profile 100 fields 116, 122 that define a multi-level bit mask. In particular, fields 116A-116N comprise a set of 32-bit words that define a first level of the bit mask and fields 122A-122M comprise a set of 32-bit words that define a second level of the bit mask. Each bit within the first level corresponds to a set of bits in the second level and is used to provide an indicator whether at least one of the bits in the second level is free. In this way, when dynamically creating a NAT binding inline, NAT element 17 scans the first level of the bit mask to quickly identify a set of bits within the lower level having at least one free bit. NAT element 17 then selects one of the free bits from the identified set of bits in the lower level and computes the corresponding port as explained above with respect to FIG. 4. When all of the bits in a given set of bits in the second level bit mask are used, NAT element sets the corresponding bit in the first level to indicate that all of the corresponding sub-range of ports are currently allocated within a NAT binding for the subscriber. In the event all of the bits within the first level of the bit mask are set, i.e., all the ports within the entire port range are currently in use, lookup ASIC 42 forwards any additional flows for the subscriber to the anchoring subscriber management service unit 10 for applying NAT within control plane 11. In one example, NAT profile 100 comprises 128 32-bit fields 122 for a total of 4K ports so as to support 4K concurrently NAT bindings for a subscriber, although in other example more or fewer bindings per subscriber may be used. In this case, four (4) 32-bit fields 116 may be used to provide a first level bit mask where each bit of the first level corresponds to a different set of thirty two (32) fields 122, thus each representing 1024 bits of the second level bit mask, i.e., 1024 different NAT bindings. In this way, a large number of concurrent packet flows can be supported for a given subscriber (e.g., 4 k flows) yet allowing fast port allocation for inline NAT. Additional levels may be used to provide support for larger port ranges per subscriber.

Figure 6:
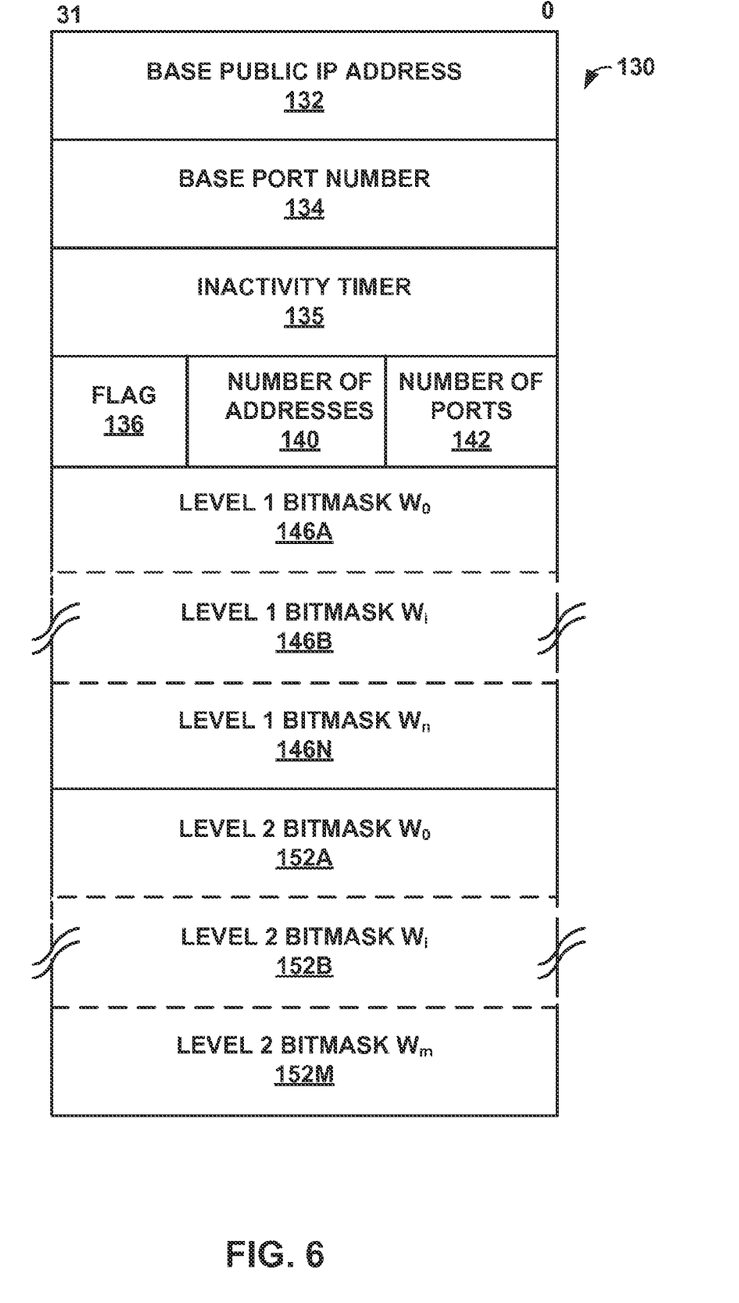

FIG. 6 another example NAT profile 130 that may be constructed by an anchoring subscriber management unit 10 and programmed into an anchoring forwarding unit 40 for a subscriber where inline network address allocation as well as port allocation is to be used. NAT profile 130 extends NAT profile 100 of FIG. 5 to support dynamic network address allocation using additional bit masks. For example, a range of public network addresses may be allocated for a subscriber, or set of subscribers, by specifying a starting network address 132 and a number of network addresses 140. A multi-level bit mask may then be used similar to that of FIG. 5, where the first level bit mask defined by fields 146 indicates whether at least one port is available for a given network address and the second level bit mask defined by fields 152 indicate whether each individual port is available or currently in use. NAT profile 130 includes an inactivity timer 135 for flushing NAT bindings for individual flows, a set of flag bits 136, and a base port number 134 and a number of ports 142 that defines a port range for the subscriber.

Figure 7:
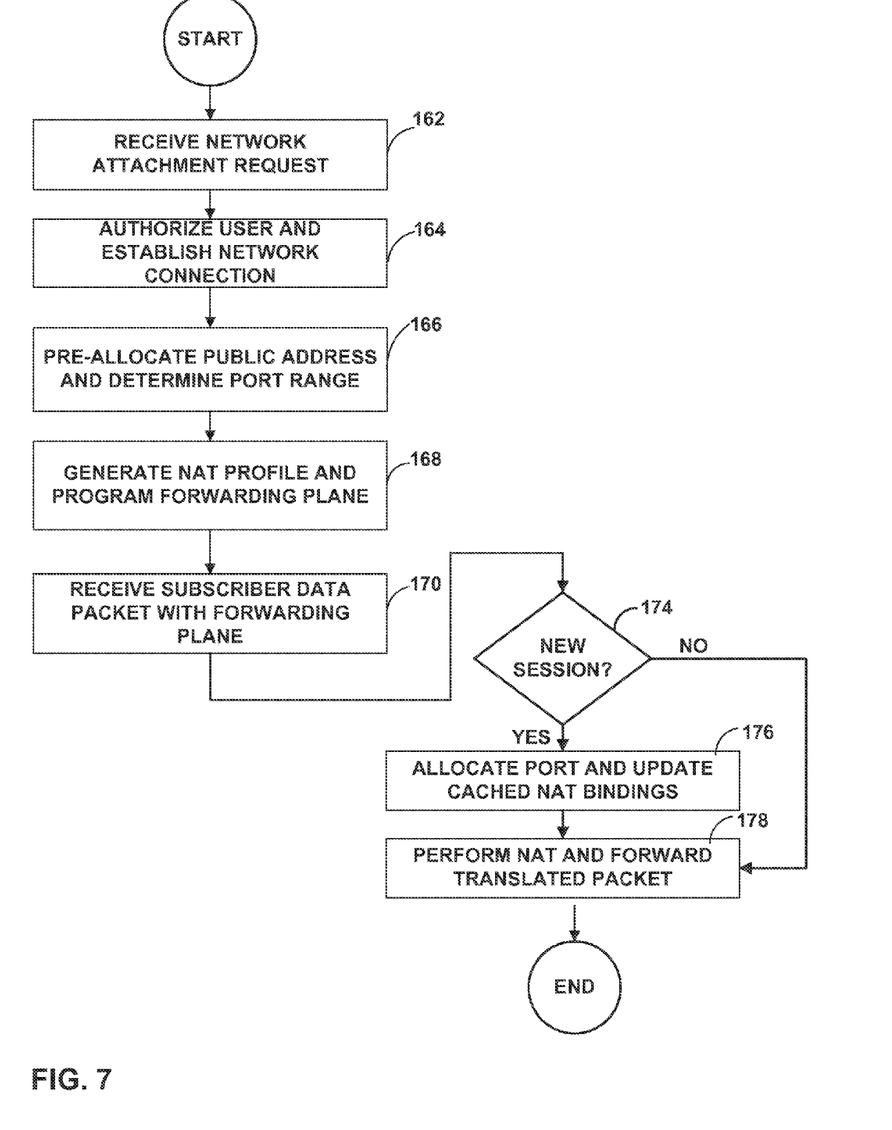
FIG. 7 is a flowchart illustrating an example embodiment of the inline network address translation (NAT) techniques described herein.

FIG. 7 is a flowchart illustrating an example embodiment of the inline network address translation (NAT) techniques described herein. Initially, mobile gateway router 8 receives a network attachment request from a wireless device, such as mobile device 6A, indicating that the wireless device requires a packet-based network connection (162). Forwarding plane 15 of mobile gateway router 8 forwards the network attachment request to one of subscriber management service unit 10, such as subscriber management service unit 10A, based on, for example, an identity of the requesting mobile device 6A. In response, subscriber management service unit 10A authenticates mobile device 6A (e.g., by way of AAA service 37A and AAA server 16), determines a private network address for use in the new network connection (e.g., by way of DHCP service 37B and DHCP server 14) and communicates with one or more network devices within mobile access network 4 ("bearers") to establish forwarding paths or tunnels for carrying packets for the network connection (164).

At this time, subscriber management service unit 10A determines a pre-allocated public address and port range for use in subsequent NAT bindings for individual communication sessions (packet flows) associated with the network connection (166). Subscriber management service unit 10A generates a specific NAT profile (e.g., NAT profiles 70, 80, 100, 130) and programs the NAT profile into the anchoring one of forwarding units 40 (168). Subscriber management service unit 10A may select and generate the NAT profile for the particular subscriber based on configuration data from an administrator or learned over time by mobile gateway 4. For example, subscriber management service unit 10A may generate the NAT profile based on subscriber information received from AAA server 16 upon authenticating the subscriber. AAA server may, for example, provide configuration data as to the number of flows to be supported for the subscriber using inline NAT. As another example, subscriber management service units 10 may periodically receive statistics from forwarding plane 15 as to the maximum or average number of concurrent communication sessions for individual subscribers, thereby allowing subscriber management service units 10 to conserve space within lookup ASICs 42 by allocating profiles having smaller bit fields and port ranges for those subscribers typically having fewer concurrent packet flows.

Upon processing a packet for the network connection with lookup ASIC 42 (170), NAT element 17 determines whether the packet is an outbound packet for a new communication session (174). If so, NAT element 17 determines dynamically creates a NAT binding for the new communication session in accordance with the NAT profile received from the anchoring subscriber management unit 10A (178). Upon creating the NAT binding, or upon determining that the packet is associated with an existing NAT binding, NAT element 17 of lookup ASIC 42A performs network address translation to translate the private source network address and source port within any outbound packet to the computed public network address and the assign port number (178). For an inbound packet, NAT element 17 reverse translates the public network address to the private network and port in accordance with the NAT binding. Unsolicited inbound packets destined for legitimate private network addresses having NAT profiles may result in NAT bindings in a similar manner or may be rejected by NAT element 17 in accordance with configuration data provided by subscriber management unit 10A, which may be conveyed by one or more flags within the NAT profile for a given subscriber.

Various embodiments of the invention have been described. These and other embodiments are within the scope of the following claims.

The invention claimed is:

1. A method comprising:
receiving, with a mobile gateway router, a request to attach a wireless device of a subscriber to a mobile wireless network;
establishing, with a control plane of the mobile gateway router, a packet-based network connection for the wireless device to communicate using the mobile wireless network, wherein establishing the network connection comprises assigning a private network address to the wireless device;
upon establishing the network connection and prior to receiving subscriber data traffic from the wireless device, pre-allocating with the control plane of the mobile gateway router a public network address and a port range for the wireless device;
constructing, with the control plane of the mobile gateway router, a network address translation (NAT) profile specifying the public network address and the port range and installing the NAT profile within a hardware forwarding element of the mobile gateway router, the NAT profile including a multi-level bit mask having a first level and a second level, each of the first level and second level having a plurality of bits, wherein each of the bits of the second level corresponds to a port within the port range and indicates whether the port is currently assigned for performing NAT for a respective packet flow associated with the wireless device, and wherein each of the bits of the first level corresponds to a different group of the bits of the second level and indicates whether at least one of the bits within the group of bits corresponds to an unused port;
upon receiving a packet of a new packet flow of the subscriber data traffic, dynamically selecting a port within the port range of the NAT profile for the subscriber based on the bit mask and creating a NAT binding within the hardware forwarding element that maps the private network address for the wireless device to the public network address and the selected port; and
performing network address translation on packets for the packet flow within the hardware forwarding element based on the NAT binding.

2. The method of claim 1, wherein performing network address translation comprises:
receiving outbound packets for the packet flow with the mobile gateway router, each of the outbound packets having the private network address of the wireless device as a private source network address, and
for each of the outbound packets, generating a translated packet with the hardware forwarding element, wherein the translated packet includes the public network address and the selected port from the range of ports in place of the private source address and a source port of the outbound packet.

3. The method of claim 1, further comprising selecting, in the control plane the NAT profile for the wireless device from a plurality of different types of NAT profiles based on historical data for the subscriber.

4. The method of claim 1, further comprising:
storing the NAT binding within an internal cache of NAT bindings within the hardware forwarding element;
upon receiving the packet the new packet flow, accessing the NAT bindings to determine whether a NAT binding exists for the new packet flow; and
creating the NAT binding within the internal cache when a NAT binding does exist for the new packet flow.

5. The method of claim 1,
wherein the control plane comprise a plurality of session management cards within the mobile gateway router device and the hardware forwarding element comprises one of a plurality of forwarding units coupled to the plurality of session management cards by a switch fabric, and
wherein constructing a NAT profile comprises constructing the NAT profile with an anchoring one of the session management cards that anchors the subscriber session in the control plane; and
wherein installing the NAT profile comprises installing the NAT profile from the anchoring one of the session management cards to an anchoring forwarding unit of the mobile gateway router responsible for routing the packet flow of the subscriber data traffic.

6. A mobile gateway router comprising:
a plurality of interfaces configured to send and receive network packets for wireless devices of subscribers of a mobile access network;
a plurality of session management cards that provide a distributed control plane to establish network connections for the wireless devices in accordance with private network addresses assigned to the wireless devices;
a forwarding integrated circuit having a forwarding information base (FIB) for routing the packets between the plurality of interfaces, the forwarding integrated circuit comprising an internal network address translation (NAT) element,
wherein each of the session management cards is programmed to construct for each subscriber a NAT profile upon authenticating the subscriber and prior to receiving subscriber data traffic from the subscriber, wherein the NAT profile specifies a pre-allocated public network address and port range and includes a multi-level bit mask having a first level and a second level, each of the first level and second level having a plurality of bits, wherein each of the bits of the second level corresponds to a port within the port range and indicates whether the port is currently assigned for performing NAT for a respective packet flow associated with the wireless device, and wherein each of the bits of the first level corresponds to a different group of the bits of the second level and indicates whether at least one of the bits within the group of bits corresponds to an unused port, and
wherein the session management cards are programmed to install the NAT profiles within the forwarding integrated circuit of the mobile gateway router for inline NAT within the forwarding integrated circuit when routing packets for the subscribers.

7. The mobile gateway router of claim 6, wherein the forwarding integrated circuit is configured to, upon receiving a packet of a new packet flow of the subscriber data traffic, dynamically select a port within the port range of the NAT profile for the subscriber, create a NAT that maps the private network address for the wireless device to the public network address and the selected port, and perform network address translation on packets for the packet flow within the hardware forwarding element based on the NAT binding.

8. The mobile gateway router of claim 7,
wherein the forwarding integrated circuit receives outbound packets for the packet flow, each of the outbound packets having the private network address of the wireless device as a private source network address, and
wherein, for each of the outbound packets, the forwarding integrated circuit generates a translated packet that includes the public network address and the selected port from the range of ports in place of the private source address and a source port of the outbound packet.

9. The mobile gateway router of claim 6, wherein the session management cards are programmed to select the NAT profiles for the subscribers from a plurality of different types of NAT profiles based on historical data for the subscribers collected by the forwarding integrated circuit.

10. The mobile gateway router of claim 6, wherein the forwarding integrated circuit includes an internal cache of NAT bindings.

11. A method comprising:
receiving, with a mobile gateway router, a request to attach a wireless device of a subscriber to a mobile wireless network;
establishing, with a control plane of the mobile gateway router, a packet-based network connection for the wireless device to communicate using the mobile wireless network, wherein establishing the network connection comprises assigning a private network address to the wireless device;
upon establishing the network connection and prior to receiving subscriber data traffic from the wireless device, pre-allocating with the control plane of the mobile gateway router a public network address range and a port range for the wireless device;
constructing, with the control plane of the mobile gateway router, a network address translation (NAT) profile specifying the public network address range and the port range and installing the NAT profile within a hardware forwarding element of the mobile gateway router, wherein constructing a NAT profile comprises constructing the NAT profile to include a first bit mask for the public network address range and a second bit mask for the port range, wherein each of the bits of the first bit mask corresponds to a public network address within the public network address range and indicating whether the public network address is currently assigned, and wherein each of the bits of the first bit mask corresponds to a port within the port range and indicating whether the port is currently assigned for a respective packet flow for the wireless device over the network connection;
upon receiving a packet of a new packet flow of the subscriber data traffic, dynamically selecting a public network address within the public network address range and a port within the port range of the NAT profile for the subscriber and creating a NAT binding within the hardware forwarding element that maps the private network address for the wireless device to the selected public network address and the selected port; and
performing network address translation on packets for the packet flow within the hardware forwarding element based on the NAT binding.

12. The method of claim 11,
wherein each of the first bit mask and the second bit mask comprises a multi-level bit mask having a first level and a second level, each of the first level and second level having a plurality of bits,
wherein each of the bits of the second level for the first bit masks corresponds to a public network address within the public network address range and indicates whether the public network address is currently assigned,
wherein each of the bits of the second level for the second bit masks corresponds to a port within the port range and indicates whether the port is currently assigned for performing NAT for a different one of the packet flows for the wireless device, and
wherein, for both the first bit mask and the second bit mask, each of the bits of the first level corresponds to a different group of the bits of the second level and indicates whether at least one of the bits within the group of bits corresponds to an unused port.

\* \* \* \* \*